US006353815B1

(12) United States Patent
Vilim et al.

(10) Patent No.: US 6,353,815 B1
(45) Date of Patent: Mar. 5, 2002

(54) STATISTICALLY QUALIFIED NEURO-ANALYTIC FAILURE DETECTION METHOD AND SYSTEM

(75) Inventors: Richard B. Vilim, Aurora, IL (US); Humberto E. Garcia, Idaho Falls, ID (US); Frederick W. Chen, Naperville, IL (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/186,306

(22) Filed: Nov. 4, 1998

(51) Int. Cl.[7] .............................................. G06F 9/445
(52) U.S. Cl. ...................................................... 706/15
(58) Field of Search .............................. 706/15, 23, 25

(56) References Cited

U.S. PATENT DOCUMENTS

| | | | | |
|---|---|---|---|---|
| 4,136,340 A | * | 1/1979 | Bishop ......................... | 342/45 |
| 4,975,975 A | * | 12/1990 | Filipski ....................... | 382/227 |
| 5,059,127 A | * | 10/1991 | Lewis et al. ................. | 434/353 |
| 5,223,207 A | * | 6/1993 | Gross et al. ................. | 376/216 |
| 5,355,324 A | * | 10/1994 | Zhang ......................... | 702/45 |
| 5,479,571 A | * | 12/1995 | Parlos et al. .................. | 706/25 |
| 5,586,221 A | * | 12/1996 | Isik et al. ..................... | 706/23 |
| 5,987,399 A | * | 11/1999 | Wegerich et al. ........... | 702/183 |
| 6,119,111 A | * | 9/2000 | Gross et al. .................. | 706/15 |

OTHER PUBLICATIONS

Machine Condition Monitoring Using Neural Networks and the Likelihood Function, by Richard B. Vilim, Humberto H. Garcia, and Frederick W. Chen. Published in *Intelligent Engineering Systems through Artificial Neural Networks*, vol. 7, Smart Engineering Systems: Neural Networks, Fuzzy Logic, Data Mining, and Evolutionary Programming at the Annie '97 conference, Nov. 9–12, 1997, University of Missouri, Rolla, Missouri.

www.google.com search listing.*

* cited by examiner

*Primary Examiner*—Mark R. Powell
*Assistant Examiner*—Michael B. Holmes
(74) *Attorney, Agent, or Firm*—Mark LaMarre; Mark Dvorscak; Virginia B. Caress

(57) ABSTRACT

An apparatus and method for monitoring a process involve development and application of a statistically qualified neuro-analytic (SQNA) model to accurately and reliably identify process change. The development of the SQNA model is accomplished in two stages: deterministic model adaption and stochastic model modification of the deterministic model adaptation. Deterministic model adaption involves formulating an analytic model of the process representing known process characteristics, augmenting the analytic model with a neural network that captures unknown process characteristics, and training the resulting neuro-analytic model by adjusting the neural network weights according to a unique scaled equation error minimization technique. Stochastic model modification involves qualifying any remaining uncertainty in the trained neuro-analytic model by formulating a likelihood function, given an error propagation equation, for computing the probability that the neuro-analytic model generates measured process output. Preferably, the developed SQNA model is validated using known sequential probability ratio tests and applied to the process as an on-line monitoring system. Illustrative of the method and apparatus, the method is applied to a peristaltic pump system.

14 Claims, 8 Drawing Sheets

STATISTICALLY QUALIFIED NEURO-ANALYTIC FAILURE DETECTION METHOD AND SYSTEM

CONTRACTUAL ORIGIN OF THE INVENTION

The United States Government has rights in this invention pursuant to Contract Number W-31-109-ENG-38 between the United States Government and Argonne National Laboratory, as represented by the University of Chicago.

TECHNICAL FIELD

The present invention relates to methods for monitoring processes utilizing an analytic model augmented with neural network, in combination with a statistical qualification technique that ensures modeling accuracy. More particularly, the invention is a system and method for monitoring a process on-line utilizing an integrated model comprised of an analytic representation of known process characteristics, a neural network for capturing unknown process characteristics, and a statistical technique for qualifying the remaining uncertainty of the combined neuro-analytic model. Known sequential probability ratio tests (SPORTS) are applied to the statistically qualified neuro-analytic (SQNA) model to achieve on-line monitoring capability and to evaluate deviant operating conditions for the process.

BACKGROUND OF INVENTION

Traditional modeling of a process involves mathematically developing first principles knowledge of the process in the form of a set of equations that describe the state of the process according to laws of conservation and possibly experimental data. The first principles model is based on known physics of the process and is therefore often referred to as the analytic or physics-based model. A process is generally monitored by an on-line comparison between the real process output in the time domain and the artificial process output generated by the physics-based model. Differences between the real and artificial process outputs are interpreted to indicate a change in the state of the process.

Unfortunately, inaccuracies in physics-based models due to modeling errors caused by variations in process characteristics, uncertainties in the process, or simply the complexity of the process itself, adversely effect the ability to conduct reliable monitoring, such that changes in process performance remain undetected or normal changes cause false alarms. In addition, the development of an accurate, detailed physics-based model, especially for complex processes, is time, labor, and capital intensive. A more specific problem associated with physics-based modeling is the inability to accurately represent the characteristics of the process after the initial start-up period, when the operating characteristics of the process have stabilized. Performing first principle studies on processes that are installed and operating is impractical, as correcting modeling errors in response to actual operating conditions is generally accomplished at a significant expense.

An alternative approach for modeling a process, particularly where process uncertainties exist, is to measure input and output values for the process and develop a process model based on the measured input-output mappings, irrespective of the underlying process characteristics. This approach is accomplished by an artificial intelligence technique: neural networking. Neural networks involve a large number of processors operating in parallel. The neural network is trained by processing large amounts of data and rules about data relationships, whereby a network learning rule is established that allows the network to adjust its connection weights in order to associate given input vectors with corresponding output vectors and to minimize the difference between real and expected output values. Currently, neural networks are employed in a wide range of applications, including speech synthesis, pattern recognition, oil exploration data analysis, weather prediction, and interpretation of nucleotide sequences, among others.

Recently, physics-based models have been combined with neural networks to better adapt the monitoring system to actual process events. A great advantage of a neural network augmented physics-based model is the inclusion of prior results, or process experience, into the monitoring system. U.S. Pat. No. 5,673,368 issued to Broese, et al. describes an augmented physics-based model for process control that continuously modifies a single parameter in the physics-based model by reducing the deviation between the mathematically computed physics-based model output and the measured, or actual, process output. The deviation is reduced after each process cycle by first supplying measured input values that influence variable parameters of the physics-based model to a neural network, whereby the neural network adaptively improves the computed results, and, next, adjusting the first principles model parameters in response to the neural network output. The Broese model, however, does not statistically qualify the accuracy of the model, which is important for a process experiencing random variations due to noise or modeling inaccuracies. In other words, the Broese model provides no mechanism for confirming that the augmented model is statistically consistent with the measured process output.

The present invention is a new and significantly improved method for monitoring complex, non-linear processes by combining traditional physics-based modeling, neural networks, and statistical techniques to overcome the disadvantages of physics-based models and physics-based models augmented by neural networks. The present statistically qualified neuro-analytic (SQNA) model provides a more sensitive and reliable process monitoring system that conforms more closely to the actual operating condition of the process, such that incipient failure conditions are more readily identified.

Therefore, in view of the above, a basic object of the present invention is to provide a method for monitoring a process that incorporates physics-based modeling, neural networking, and statistical qualification techniques to achieve significantly improved monitoring performance, e.g., reduced false alarms and/or increased detection sensitivity.

Another object of this invention is to provide an accurate and reliable on-line method for monitoring a process or apparatus having a high level of uncertainty.

Another object of this invention is to provide a statistically qualified neuro-analytic modeling system for complex processes that cannot be adequately represented by traditional modeling techniques, including physics-based modeling and/or neural network modeling.

Yet another object of this invention is to provide a method for monitoring a process, including providing statistical qualification of the accuracy of the model.

Additional objects, advantages and novel features of the invention will be set forth in the description which follows and will become apparent to those skilled in the art upon examination of the following or may be learned by practice of the invention. The objects and advantages of the invention may be realized and attained by means of instrumentation and combinations particularly pointed out in the appended claims.

BRIEF SUMMARY OF THE INVENTION

Briefly, the present method for monitoring a process involves applying a unique statistically qualified neuro-analytic (SQNA) model to a process having known and unknown characteristics for accurately and reliably identifying changes in the process state. The SQNA monitoring system is developed in two general steps: deterministic model adaption and stochastic model adaptation. The developed SQNA model is validated using known sequential probability ratio tests (SPRT), e.g., Wald's SPRT, and applied to the process as an on-line monitoring system.

Deterministic model adaption involves first formulating a physics-based model, also referred to as the analytic model, that represents the certain, known characteristics of the process to be monitored in the form of a state equation and an output equation. Next, a neural network is incorporated into the analytic model by adding neural network vector functions to the analytic model state and output equations, such that the uncertain, unknown characteristics of the process are represented in the resulting combined neuro-analytic model. The neuro-analytic model is trained by adjusting the neural network weights according to a unique scaled equation error minimization technique, producing a trained neuro-analytic model that is closely adapted to the actual operating state of the process.

Stochastic model adaptation involves qualifying any remaining uncertainty in the trained neuro-analytic model resulting from factors such as changing process dynamics during data collection, lingering unmodeled process state variables, and/or process input and output noise, among others. Stochastic model adaptation is accomplished by first describing the error (e.g., process input/output noise and state uncertainty) in the state and output equations of the neuro-analytic model by inserting independent random vectors representing the error into the state and output equations of the neuro-analytic model. The resulting state and output equations are linearized, and a single equation comprising only independent variables is written, referred to as the error propagation formula, that describes the propagation of the error (e.g., process input/output noise and state uncertainty) to the output equation. Remarkably, the state equation has been eliminated from the error propagation equation.

Next a likelihood function is written for maximizing the likelihood that the neuro analytic model generates the actual measured process output. The likelihood function is formulated from the error propagation equation by estimating the variances of the process noise (input/output) and state uncertainty random vectors, and an iterative scheme is used to determine the maximum likelihood solution, or, alternatively, the minimum of the negative of the log likelihood function. Thus, the likelihood function is used to statistically qualify, or calibrate, the trained neuro-analytic model of the process.

In the preferred embodiment, known statistical techniques, such as Wald's SPRT, are used to confirm that the statically qualified neuro-analytic (SQNA) model accurately describes the actual process. Wald's SPRT may also be used to apply the SQNA model on-line to monitor for chances in the process state.

Advantageously, the present SQNA model has improved process monitoring performance, such that false alarms and failures to detect process anomalies are minimized.

BRIEF DESCRIPTION OF THE DRAWINGS

The appended claims set forth those novel features which characterize the invention. However, the invention itself, as well as further objects and advantages thereof, will become readily apparent from consideration of the following detailed description of a preferred embodiment, in conjunction with the accompanying drawings, wherein:

DETAILED DESCRIPTION OF THE INVENTION

The present invention relates to a statistically qualified neuro-analytic (SQNA) system and method for monitoring a process to detect changes in the process state. The SQNA system and method uniquely combines a physics-based approach, neural networking, including an error minimization training technique, and statistical qualification to produce an accurate model of the process, such that changes in the process are reliably detected, false alarms are reduced, and incipient failures are correctly predicted.

Figure 1:
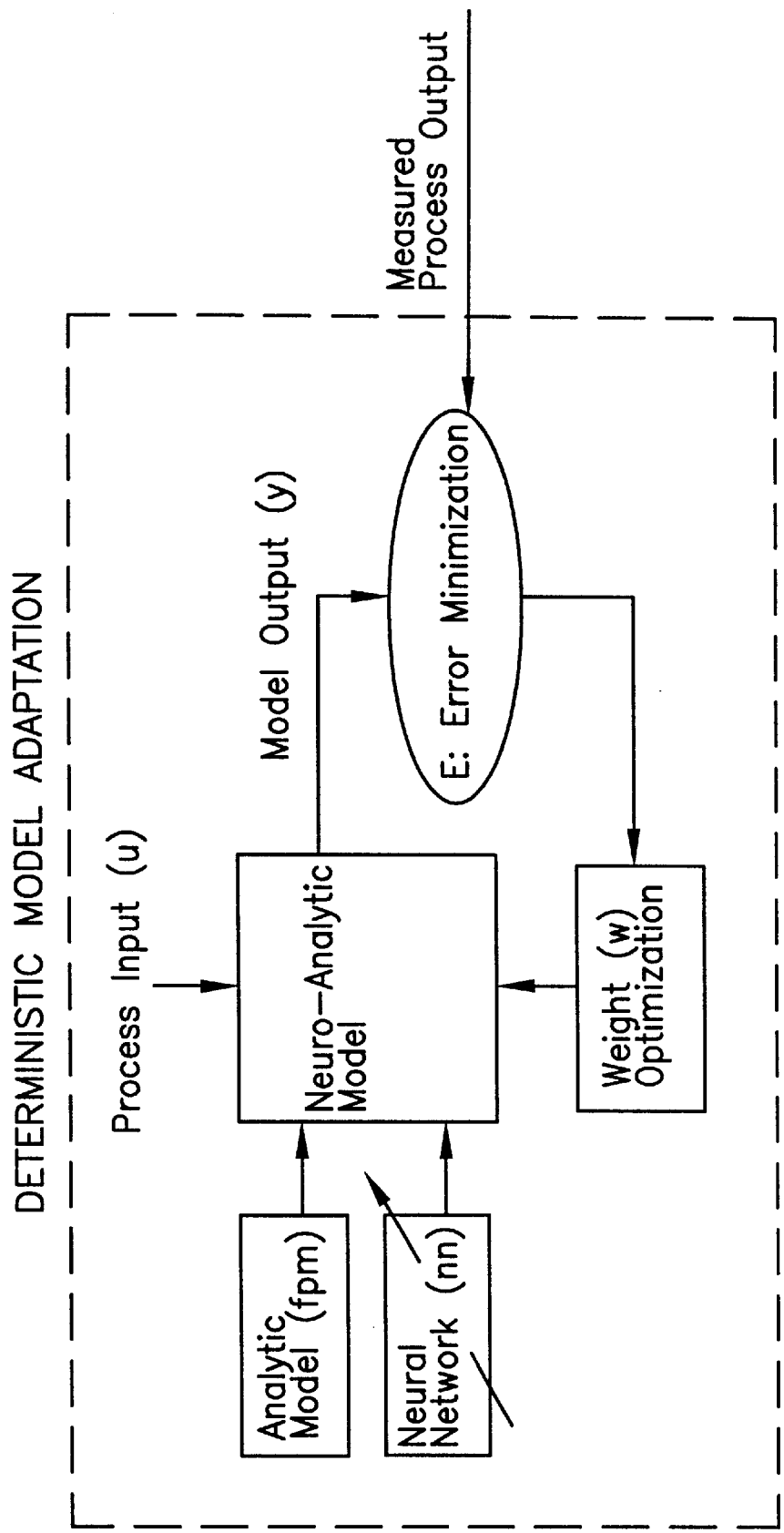
FIG. 1 is a schematic illustration of Deterministic Model Adaptation in the development of the statistically qualified neuro-analytic (SQNA) model.

The statistically qualified neuro-analytic (SQNA) model is developed in two general steps: deterministic model adaptation and stochastic model adaptation. Deterministic model adaptation, as shown schematically in FIG. 1, involves augmenting a physics-based or analytic model of the process with a neural network, and utilizing a unique scaled equation error minimization technique to train the combined analytic and neural network model, referred to herein as the neuro-analytic model, to closely approximate the actual process state.

The analytic model mathematically describes the relationships between the variables of the process according to laws of conservation, and, in some cases, measured process data. The laws of conservation for the steady state of the process, written in lumped parameter form, include a state equation ($f_{fpm}[\cdot]$) and an output equation ($g_{fpm}[\cdot]$), appearing as $$0 = f_{fpm}[x,u,\alpha] \quad (1)$$

$$y = g_{fpm}[x,u,\alpha] \quad (2)$$

where "fpm" indicates that the model is based on first principles information (e.g., laws of conservation, physics, and known process characteristics). According to the analytic model, x is the state vector [m×1], u is the input vector [r×1], y is the output vector [n×1], and α represents engineering design parameters. The elements of the state vector are mass, energy, and momentum averages derived from conservation balances. In the dynamic case, time derivatives of the states are equated to $f_{fpm}[x,u,\alpha]$ in Eq. (1).

The analytic model is only an approximate representation of the steady state of the process due to the inclusion of modeling simplifications and assumptions and the exclusion of uncertain or unknown process characteristics that effect the actual process output. Therefore, the analytic model is augmented with neural network mapping to account for uncertain process characteristics, whereby the resulting neuro-analytic model more closely describes the process. The state and output equations, Eqs. (1) and (2), respectively, of the analytic model are augmented with state and output neural network vector functions $f_{nn}[\cdot]$ and $g_{nn}[\cdot]$ to produce the neuro-analytic model, appearing as $$0 = f_{fpm}[x,u,\alpha] + f_{nn}[x,u,w] \quad (3)$$

$$y = g_{fpm}[x,u,\alpha] + g_{nn}[x,u,w] \quad (4)$$

where w represents the neural network weights. Preferably, a standard multi-layer feed-forward neural network is employed.

The present method assumes that the contribution of the unmodeled physics or uncertain process characteristics to the behavior of the process is observable in the input-output measurements mapped by the neural network, and that the uncertain process characteristics do not introduce additional state variables, i.e. the uncertain process characteristics involve the transfer of mass, energy, and momentum between existing lumped parameter nodes modeled pathways and possibly unmodeled pathways. The neural network better approximates the measured behavior of the process by utilizing forcing functions and the state vector as input and returning a value that is added to the analytic model equations.

Next, the neuro-analytic model is subjected to a unique training technique that fits or adjusts the neuro-analytic model to the actual operating state of the process. The training technique minimizes the error (E) between the neuro-analytic model output and the actual measured process output by forcing their agreement for a given a set of input values. Conventionally, a physics-based model augmented by a neural network is trained to approximate the actual process by estimating and adjusting the state vector (x) and the neural network weights (w) to fit the neural network augmented physics-based model to measured training data, whereby the difference between the model and the actual process outputs are minimized. The present SQNA system and method, however, utilizes a unique error minimization technique that calculates the states and neural network weights in a way that scales the contribution from the state equation, Eq. (3), and the contribution from the output equation, Eq. (4).

According to the present invention, input and output data is measured and collected for the process, and the data is expressed mathematically as $u_{meas}(I), y_{meas}(I)$, I=1, ... N, where u is the input vector [r×1] comprised of input values, y is the output vector [n×1] comprised of process output values, and the subscript "meas" denotes measured data. The exact value of the state vector ($x_e$), which is generally unknown, is approximated by $x_a$ defined through $$0 = f_{fpm}[x_a, u_{meas}, \alpha] + f_{nn}[x_a, u_{meas}, w] \quad (5)$$

$$y_{meas} = g_{fpm}[x_a, u_{meas}, \alpha] + g_{nn}[x_a, u_{meas}, w] \quad (6)$$

The neuro-analytic model is trained by adjusting the neural network weights (w) to solve the augmented state and output equations, Eqs. (5) and (6), where $x_a$ is the least squares solution to $$0 = f_{fpm}[x_a, u_{meas}, \alpha] \quad (7)$$

$$g_{nn}[x_a, u_{meas}, w] = y_{meas} - g_{fpm}[x_a, u_{meas}, \alpha] \quad (8)$$

Next, the neuro-analytic model state and output equations, Eqs. (3) and (4), are simultaneously minimized and a scaling technique is employed to provide an improved representation of the actual process for monitoring the process. The scaling technique includes defining a maximum operating condition (moc) to scale or equalize the state equation and output equation contributions to the neuro-analytic model output. In particular, the maximum operating condition (moc) is defined for each element of $f_{fpm}$ and ($y-g_{fpm}$) as the maximum magnitude reached by the element over all sample times. Incorporating the maximum operating condition (moc) into the training equation results in an error minimization formula for the neuro-analytic model that ensures the trained neuro-analytic model is not biased toward either the solution of the state equation or the output equation. If k denotes a time at which the input vectors u and output vectors y are sampled, then the error between the neuro-analytic model and the actual process is governed by the equation $$E = \sum_{K=1}^{K}\sum_{i=1}^{m}\left(\frac{f_{fmp(i)}[x_a(k),u(k),\alpha]+f_{nn(i)}[x_a(k),u(k),w]}{moc_i}\right)^2 + \sum_{K=1}^{K}\sum_{j=1}^{n}\left(\frac{y(k)_j - g_{fpm(j)}[x_a(k),u(k),\alpha]-g_{nn(j)}[x_a(k),u(k),w]}{moc_{m+j}}\right)^2 \quad (9)$$

The variable I references the elements of the neuro-analytic model state equation: $f_{fpm}$ and $f_{nn}$, and the variable j references the elements of the neuro-analytic model output equation: $g_{fpm}$ and $g_{nn}$. K denotes the number of samples. The neural network weights (w) are adjusted until the error (E) between the neuro-analytic model and the actual process is minimized to an acceptable or desired value, e.g., less than 1%.

Thus, deterministic model adaption involves developing an analytic model comprised of a state equation and an output equation for the process to be monitored, augmenting the analytic model equations with neural network state and output vector functions, and utilizing an error minimization and equation scaling technique to train the combined neuro-analytic model to more closely describe the actual process state, resulting in a trained neuro-analytic model for the process.

Figure 2:
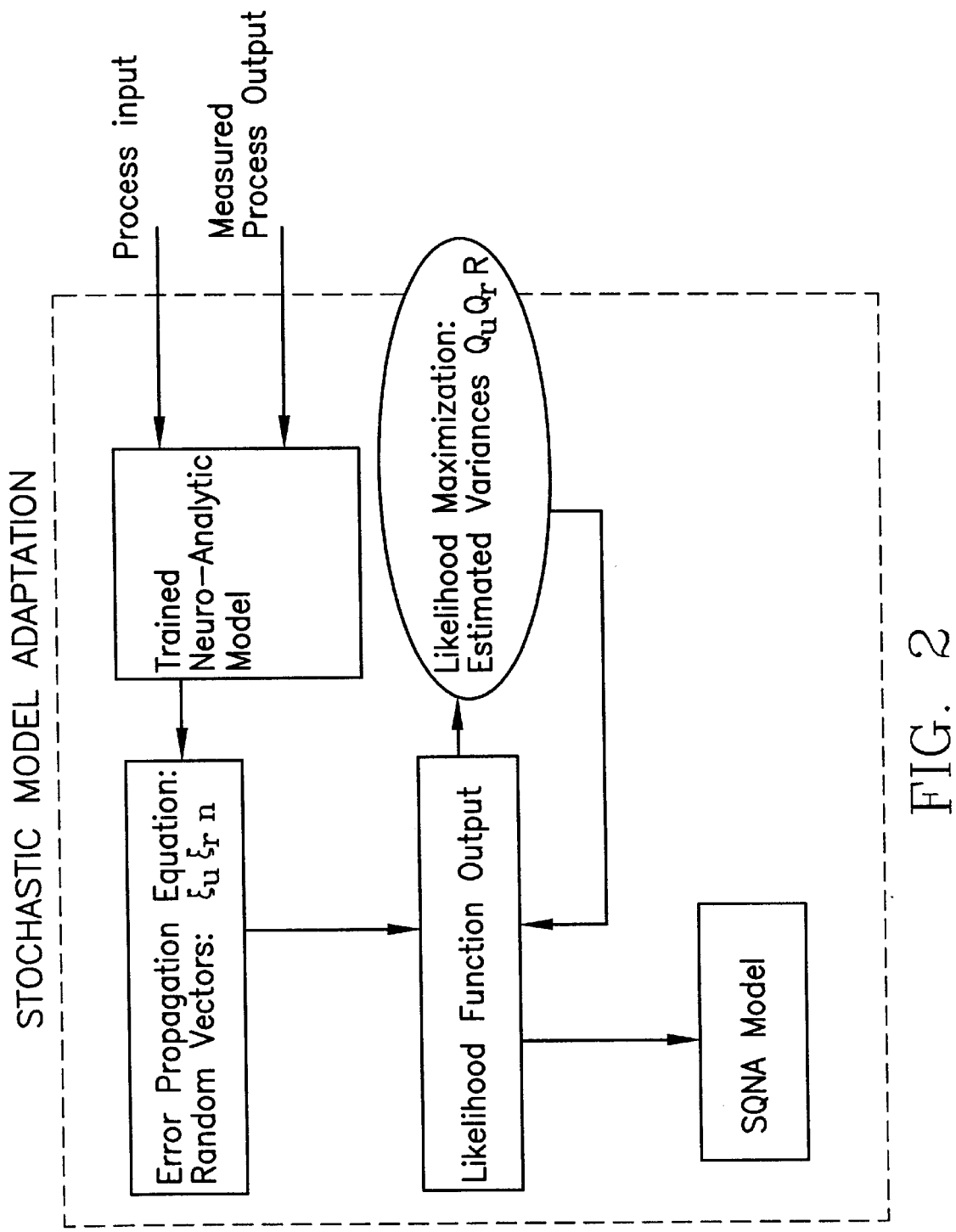
FIG. 2 is a schematic illustration of Stochastic Model Adaptation in the development of the SQNA model.

FIG. 2 schematically illustrates the second general step in the development of the SQNA model: stochastic model adaptation. Stochastic model adaptation estimates the uncertainty in the trained neuro-analytic model by incorporating a statistical maximum likelihood method. The uncertainty in the trained neuro-analytic model is representative of any remaining difference between the trained neuro-analytic model output and the actual process output, differences caused by changing process dynamics during data collection, lingering unmodeled process state variables, and/or sensor noise, among other factors.

Stochastic model adaptation is accomplished by first describing the uncertainty, or error (e.g., process input/output noise and state uncertainty), in the state and output equations of the neuro-analytic model using independent random vectors, linearizing the resulting state and output equations, and deriving from the linearized equations a single equation comprising only independent variables, referred to as the error propagation equation. The error propagation formula expresses the effect or propagation of the process input/output noise and state uncertainty error on the neuro-analytic model output. Next, a likelihood function is written using the error propagation equation for maximizing the probability that the neuro analytic model is an accurate representation of the actual process output. These steps are described in detail below.

First, an error propagation equation is developed by incorporating the remaining uncertainty, comprised of the state equation error ($\xi_r$), input noise ($\xi_u$), and output noise ($\eta$), into the neuro-analytic model, and linearizing the resulting equations. The state equation is eliminated, and the output equation that results is a function of only random variables ($\xi_r$, $\xi_u$, and $\eta$).

Given $x_e$, the exact or true state of the actual process; w, the neural network weights; and the terms $f_{nn}[x_e,u,w]$ and $g_{nn}[x_e,u,w]$, neural network mappings of the unmodeled physics or uncertain process characteristics that serve to correct for errors and approximations in the analytic model; the state error equation and corresponding output equation appear as $$\xi_r = f_{fpm}[x_e, u, \alpha] + f_{nn}[x_e, u, w] \quad (10)$$

$$y = g_{fpm}[x_e, u, \alpha] + g_{nn}[x_e, u, w] \quad (11)$$

where $\xi_r$, the state equation error, is assumed to be a zero mean normally distributed random vector. If $x_a$ is the value of x calculated by the analytic model from the measured ordered pair (u, y), then the error in $x_a$ compared to $x_e$ is assumed to be given by $$x_e = x_a + \xi_x \quad (12)$$

where $\xi_x$ is a normal random vector dependent on $\xi_r$. To represent input noise and output noise, Eqs. (10) and (11) are rewritten to include two additional random vectors $\xi_u$, $\eta$, as $$\xi_r = f_{fpm}[x_a, u, \alpha, \xi_u, \xi_x] + f_{nn}[x_a, u, w, \xi_u, \xi_x] \quad (13)$$

$$y = g_{fpm}[x_a, u, \alpha, \xi_u, \xi_x] + g_{nn}[x_a, u, w, \xi_u, \xi_x] + \eta \quad (14)$$

where $\xi_u$ is a normal random zero vector representing input noise and $\eta$ is a normal random zero mean vector representing output noise, e.g., sensor noise. The vectors $\xi_r$, $\xi_u$, and $\eta$ are each assumed to be independent of one another.

The error propagation equation is written to describe the propagation of the uncertainties in the process, as represented by vectors $\xi_r$, $\xi_u$, and $\eta$, to the output equation. Eqs. (13) and (14) are linearized, i.e., Eqs. (13) and (14) are expanded in a Taylor series and the second and higher order derivatives are dropped, as shown below. (The calculation of the partial derivatives of $f_{nn}$ and $g_{nn}$ is facilitated by the use of the chain rule for composite functions.)

$$\xi_r = \left(\frac{\partial f_{fpm}}{\partial \xi_x}\bigg|_{x,u,\alpha,0,0} + \frac{\partial f_{nn}}{\partial \xi_x}\bigg|_{x,u,w,0,0}\right)\xi_x + \left(\frac{\partial f_{fpm}}{\partial \xi_u}\bigg|_{x,u,\alpha,0,0} + \frac{\partial f_{nn}}{\partial \xi_u}\bigg|_{x,u,w,0,0}\right)\xi_u \quad (15)$$

$$y = g_{fpm}[x_a, u, a, 0, 0] + g_{nn}[x_a, u, w, 0, 0] + \left(\frac{\partial g_{fpm}}{\partial \xi_x}\bigg|_{x,u,\alpha,0,0} + \frac{\partial g_{nn}}{\partial \xi_x}\bigg|_{x,u,w,0,0}\right)\xi_x + \left(\frac{\partial g_{fpm}}{\partial \xi_u}\bigg|_{x,u,\alpha,0,0} + \frac{\partial g_{nn}}{\partial \xi_u}\bigg|_{x,u,w,0,0}\right)\xi_u + \eta \quad (16)$$

If A, B, C, and D are defined as $$A = \frac{\partial f_{fpm}}{\partial \xi_x}\bigg|_{x,u,\alpha,0,0} + \frac{\partial f_{nn}}{\partial \xi_x}\bigg|_{x,u,w,0,0} \quad B = \frac{\partial f_{fpm}}{\partial \xi_x}\bigg|_{x,u,\alpha,0,0} + \frac{\partial f_{nn}}{\partial \xi_x}\bigg|_{x,u,w,0,0}$$

$$C = \frac{\partial g_{fpm}}{\partial \xi_x}\bigg|_{x,u,\alpha,0,0} + \frac{\partial g_{nn}}{\partial \xi_x}\bigg|_{x,u,w,0,0} \quad D = \frac{\partial g_{fpm}}{\partial \xi_x}\bigg|_{x,u,\alpha,0,0} + \frac{\partial g_{nn}}{\partial \xi_x}\bigg|_{x,u,w,0,0}$$

then $$\xi_x = A^{-1}(\xi_r - B\xi_u) \quad (17)$$

$$y = g_{fmp}[x_a, u, \alpha, 0, 0] + g_{nn}[x_a, u, w, 0, 0] + C\xi_x + D\xi_u + \eta \quad (18)$$

Combining Eqs. (17) and (18), the output equation is expressed as a function of only random variables that are independent of each other, referred to as the error propagation equation, and appearing as $$y = g_{fmp}[x_a, u, \alpha, 0, 0] + g_{nn}[x_a, u, w, 0, 0] + CA^{-1}\xi_r + (D - CA^{-1}B)\xi_u + \eta \quad (19)$$

In error propagation equation, Eq. (19), the sensor noise ($\eta$) and state uncertainty ($\xi_r$) are assumed to be small compared to the mean values of the sensor signals and state variables, respectively. Importantly, the state equation has been eliminated.

Next, the error propagation equation, Eq. (19), is used to write a likelihood function for the modeled process. Given normal random vectors $\xi_r$, $\xi_u$, and $\eta$ having estimated variances $Q_r$, $Q_u$, and R, respectively, the variance of y is expressed as $$K = CA^{-1}Q_r(CA^{-1})^T + (D - CA^{-1}B)Q_u(D - CA^{-1}B)^T + R \quad (20)$$

The likelihood function y is then expressed as $$f(y) = \frac{1}{(2\pi)^{n/2}(\det K)^{1/2}} e^{-\frac{1}{2}(y-\mu)^T K^{-1}(y-\mu)} \quad (21)$$

where the mean value $\mu$ is given by $$\mu = g_{fpm}[x_a, u, \alpha, 0, 0] + g_{nn}[x_a, u, w, 0, 0] \quad (22)$$

Given several ordered pairs of input and output measurements, e.g., $(u_1, y_1), (u_2, Y_2), \ldots (u_N, y_N)$, and values for $Q_u$ and R, the log likelihood function is $$-\ln f(y_1, y_2, \ldots y_n) = \frac{nN}{2}\ln 2\pi + \sum_{i=1}^{N}\frac{1}{2}\ln(|K_i|) + \frac{1}{2}(y_i - u)^T K_i^{-1}(y - \mu)_i \quad (23)$$

The maximum likelihood method is used to estimate the uncertainty represented by the covariance matrix $Q_r$ of the state equation. The maximum likelihood solution is the set of parameter values that maximize the likelihood function, or, equivalently, minimize the negative of the log likelihood function given by Eq. (23). An iterative scheme is used to calculate these values.

In summary, the present statistically qualified neuro-analytic (SQNA) system and method uniquely combines deterministic model adaptation, involving augmenting an analytic model with a neural network and training the augmented neuro-analytic model according to a scaled equation error minimization technique, and stochastic model adaptation, involving the statistical qualification of the trained neuro-analytic model utilizing an error propagation equation and the likelihood function to produce an accurate model for significantly improved process monitoring.

Figure 3:
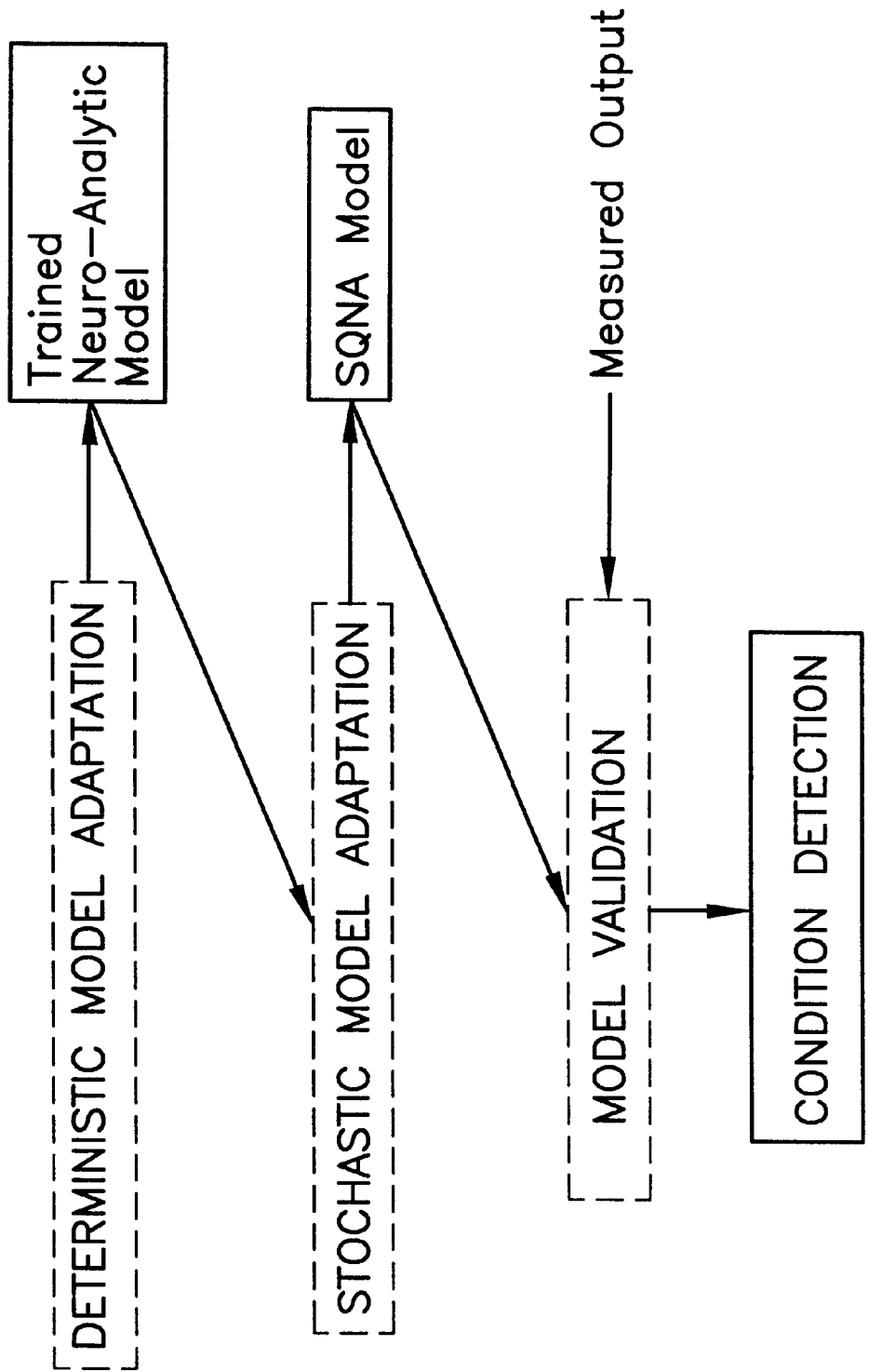
FIG. 3 is a schematic illustration of the SQNA model, in combination with a known model validation technique.

As schematically shown in FIG. 3, the preferred embodiment of the SQNA system and method for monitoring a process further includes known sequential testing techniques, such as Wald's sequential probability ratio test (SPRT), to determine whether the SQNA model is a valid representation of the actual physical process and/or to monitor the process on line. Wald's SPRT is particularly relevant for monitoring system applications in which data is collected sequentially, such that every sampling case is analyzed directly after collection and the aggregate collected data is available for comparison to threshold values. In this way, decisions about the process are made during data collection and after fewer sampling cases than traditional sampling techniques, whereby quality control activities are activated quickly and efficiently.

Wald's SPRT technique is herein combined with the SQNA model to detect process drift, i.e. a difference between the measured process data and the mean value of the SQNA model. When the drift reaches a desired threshold, a process failure is announced. According to Wald's SPRT, for a given random process r uncorrelated in time, normally distributed with a zero mean, and dependent on a parameter $\delta$ (drift) having a value of either $\delta_0$ or $\delta_1$, the likelihood of observing $r_i$ given the parameter value $\delta_j$ is denoted $f(r_i, \delta_j)$. As each new observation becomes available, the value of $\delta$, based on the sequence of observations $r_1, r_2, \ldots r_m$, is statistically represented as a ratio of likelihoods:

$$S_m = \frac{f(r_1, \delta_1) f(r_2, \delta_1)}{f(r_1, \delta_o) f(r_2, \delta_o)} \cdots \frac{f(r_m, \delta_1)}{f(r_m, \delta_o)} \quad (24)$$

Two hypotheses are formed: $H_0$, whereby $\delta = \delta_0$, and $H_1$, whereby $\delta = \delta_1$. The decision process becomes if $S_m \leq B$ terminate and accept $H_0$ if $B < S_m < A$ continue sampling, else  (25)

if $S_m \geq A$ terminate and accept $H_1$ with the probability that the wrong decision is given by $$A = \frac{1-\beta}{\alpha} \quad \text{and} \quad B = \frac{\beta}{1-\alpha}$$

where $\alpha$ is the probability that the test will result in the selection of $H_1$ when hypothesis 0 is correct, and $\beta$ is the probability that the test will result in the selection of $H_0$ when hypothesis 1 is correct. The values of $\alpha$ and $\beta$ as set by the user determine the sensitivity for missed detection and false alarm events.

After each sample measurement, the likelihood ratio test is used to decide whether the SQNA model is a statistically valid representation of the measured process output, or whether drift has occurred. Drift ($\delta$) is a residual vector defined as the difference between the process output ($y_{measi}$) and the SQNA model output ($y_i$) for an input value ($u_i$), as $$r_i = y_{measi} - y_i \quad (26)$$

Where the process output ($Y_{measi}$) and the model output ($y_i$) have the same covariance matrix $K_i$, and the mean value of the SQNA model output and the process output is $\mu$ and $\mu+\delta$, respectively, then the likelihood function for the residual vector ($\delta$) is represented as $$f(y_{measi}, \delta) = \frac{1}{(2\pi)^{n/2} (\det K)^{1/2}} e^{-\frac{1}{2}(y_{measi}-\mu-\delta)^T K_i^{-1}(y_{measi}-\mu-\delta)} \quad (27)$$

A threshold is established for declaring a failure in the process, whereby the process output has drifted away from the SQNA model output by a predetermined amount: $\delta = \delta_{failure}$. For two hypotheses, $H_0$ where $\delta = 0$ and $H_1$ where $\delta = \delta_{failure}$, the decision as to whether or not a failure has occurred is given by Eq. 25, where the likelihood function is given by Eq. 27.

For validation model to be a symmetric test for process drift away from the SQNA model, a second test is required for the case where $\delta = -\delta_{failure}$. If the test is to be symmetrically applied independently to each output, then a total of 2N tests are needed for N outputs. If K is constant, then a convenient formula to use is given by the natural logarithm of $S_m$, as $$\ln S_m = \frac{1}{2} \sum_{i=1}^{m} (y_{measi} - \mu - \delta_0)^T K^{-1} (y_{measi} - \mu - \delta_0) - \quad (28)$$

$$(y_{measi} - \mu - \delta_1)^T K^{-1} (y_{measi} - \mu - \delta_1)$$

The present SQNA model for monitoring a process combines deterministic model adaptation, stochastic model adaptation, and, preferably, model validation principles to produce an accurate and reliable process monitoring system. The resulting SQNA model is executed using on-line data from the process and the hypothesis testing function determines the likelihood ratio of the SQNA model output equation for each new data sample, whereby an alarm signals a statistically significant deviation between SQNA model and measured process data.

Figure 4:
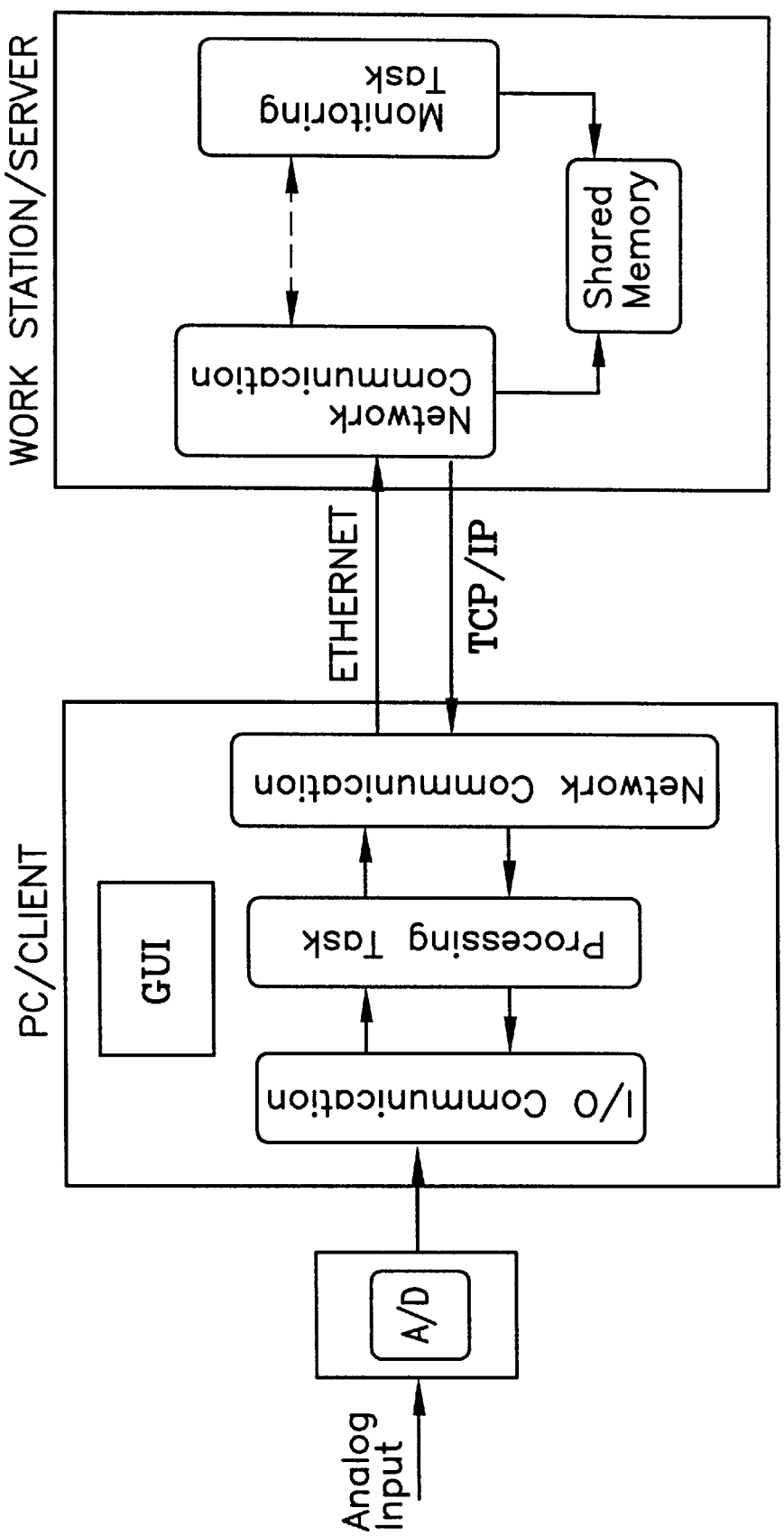
FIG. 4 is a schematic illustration of a distributed computer platform for executing the SQNA model.

Known computer systems, such as a distributed computer platform, are utilized to implement the SQNA model, including input/output (I/O) computers, monitoring computers, and data acquisition, data filtering and conditioning, data communication, training, prediction, statistical testing, and user interface software. FIG. 4 is a schematic illustration of a distributed computer platform for executing the SQNA model.

EXAMPLE

As a non-limiting example of the present statistically controlled neuro-analytic (SQNA) model for process monitoring, a peristaltic pump was monitored for detection of subtle changes in its operating condition over a period of time. Peristaltic pumps have certain or fixed characteristics, e.g., flow rate is proportional to pump motor speed, and uncertain characteristics that may result from anomalous mechanical loads on the pump (i.e., bearing failure) and degradation of pump components, among others. Peristaltic pumps generally experience a reduction in flow rate over the operating life of the pump, as tube walls experience fatigue, and the pump's ability to positively displace fluid diminishes, until eventually the tube fails. By monitoring the change in the electrical power consumed by the pump motor (back emf) at a given speed, the reduction in pumping capability is inferred and incipient failure of the pump predicted. The SQNA model and method is utilized to determine the relationship between speed and power during normal operation, such that an abnormal operating condition is accurately and reliably detected.

Figure 5:
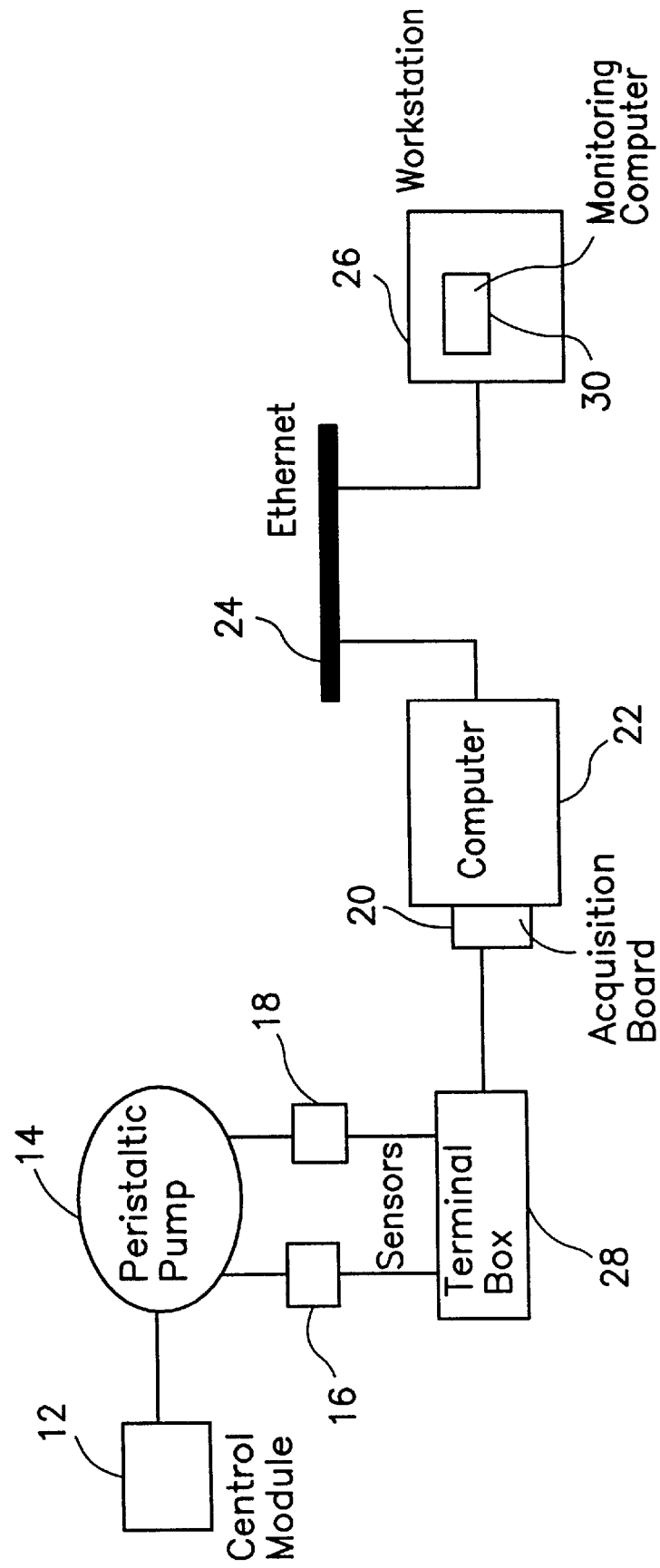
FIG. 5 is a schematic illustration of an SQNA model for monitoring the condition of a peristaltic pump.

FIG. 5 is a schematic of the peristaltic pump system, or process. The system is comprised of a control module 12 for controlling the speed of the peristaltic pump 14, two current sensors 16, 18, an I/0 computer 22 equipped with a data acquisition (DAQ) board 20, a workstation 26 to implement the monitoring computer 30, and supporting equipment known to those skilled in the art, e.g., terminal box 28, Ethernet 24, power supply (not shown). Measured data was acquired and conditioned using bidirectional current sensors 16, 18 to measure the pump armature current and voltage. The time averaged motor power was calculated from the computed armature current and voltage values, and the back emf was computed from the armature voltage. The time averaged power and back emf for the measured data were filtered through the I/O computer 22 and sent to the monitoring computer 30.

An SQNA system and method for monitoring the steady state of the peristaltic pump process was developed according to the present invention. First, deterministic model adaptation was accomplished by developing an analytic model of the peristaltic pump process by applying the laws of conservation and physics to mathematically describe the relationship among pump speed, fluid temperature, and pump electric power. The analytic model for the peristaltic pump system is expressed as $$0 = \eta u - \frac{B}{K_b}x - \frac{T_L}{K_b}x - f\frac{1}{2}\frac{L}{D}\rho\left(\frac{x}{K_b}\right)^3 K \quad (29)$$

$$y = x \quad (30)$$

where $\eta$=efficiency of the motor

B=viscous coefficient of the pump shaft

L=length of the hydraulic circuit $T_L$=viscous coefficient of the pump rollers for length L f=friction coefficient of the hydraulic circuit D=hydraulic diameter of the hydraulic circuit, $\rho$ is the density of the fluid $K_b$=proportionality constant relating flow rate to angular velocity u=pump power averaged over at least one rotation of the pump shaft (input value)

x=back emf

Variables influencing mechanical changes in the tube are complex, and, therefore, attempting to represent them in the analytic model is impractical. These and other uncertainties in the pump system were learned as a mapping by a neural network of the difference between measured process variables for the pump and the approximate values generated by the analytic model, Eqs. (29) and (30). For example, changing values for variables during operation of the pump system was unaccounted for in the analytic model, as the analytic model assumes these values remain constant over time. The combined neuro-analytic model is $$0 = \eta u - \frac{B}{K_b}x - \frac{T_L}{K_b}x - f\frac{1}{2}\frac{L}{D}\rho\left(\frac{x}{K_b}\right)^3 K + f_{nn}[u, x, x^2, x^3, w] \quad (31)$$

$$y = x + g_{nn}[u, x, x^2, x^3, w] \quad (32)$$

where the parameter values are fixed over the operating range. The neural network is comprised of one hidden layer with two nodes, three input nodes (x, $x^2$, and $x^3$), and two output nodes, an output node corresponding to the measurement equation (32) and an output node corresponding to the state equation (31). (Input u was not entered into the neural network to avoid creating a co-linearity).

The neuro-analytic model was adjusted according to the unique training technique for minimizing the error (E) between the neuro-analytic model output and the measured pump output. The exact value of the state vector ($x_e$) was approximated by $x_a$, and the neuro-analytic model was trained by adjusting the neural network weights (w) to solve the augmented state and output equations, Eqs. (31) and (32), as follows:

$$-f_{nn}[u, x, x^2, x^3, w] = \eta u - \frac{B}{K_b}x - \frac{T_L}{K_b}x - f\frac{1}{2}\frac{L}{D}\rho\left(\frac{x}{K_b}\right)^3 K \quad (33)$$

$$g_{nn}[u, x, x^2, x^3, w] = y - x \quad (34)$$

An error minimization formula was derived for simultaneously minimizing the state and output equations for the neuro-analytic model, appearing as $$E = \sum_{K=l}^{K} \sum_{i=1}^{m} \left(\frac{f_{fmp(i)}[x(k), u(k), \alpha] + f_{nn(i)}[x(k), u(k), w]}{moc_i}\right)^2 + \sum_{K=1}^{K} \sum_{j=1}^{n} \left(\frac{y(k)_j - g_{fpm(j)}[x(k), u(k), \alpha] - g_{nn(j)}[x(k), u(k), w]}{moc_{m+j}}\right)^2 \quad (35)$$

Training the neural-analytic model was performed using measured data, and a genetic algorithm was used to generate initial values for the network weights in the neighborhood of the global minimum of Eqs. (33) and (34). Training data was generated by varying the speed of the motor in a step-wise fashion as water was pumped through the hydraulic circuit. These values were then used as the starting point for a conjugate gradient search. The neural network weights (w) were adjusted until the error (E) between the neuro-analytic model and the actual process was minimized to less than about 1%.

Next, stochastic model adaptation was accomplished by estimating the uncertainty in the trained neuro-analytic model (e.g., sensor noise). The uncertainties were modeled as random variables and inserted into the neuro-analytic model as follows:

$$\xi_r = \eta(u + \xi_x) - \frac{T_L}{K_b}(x + \xi_x) + f\frac{1}{2}\frac{L}{D}\rho\left(\frac{x + \xi_x}{K_b}\right)^3 K + f_{nn}[(x + \xi_x, (x + \xi_n)^3, w] \quad (36)$$

$$y = (x + \xi_x) + g_{nn}[x + \xi_x, (x + \xi_x)^2, (x + \xi_x)^3, w] + \eta \quad (37)$$

where $\xi_u$, $\xi_r$, and $\eta$ have covariances $Q_u$, $Q_r$, and R, respectively. The estimated uncertainties $\xi_u$, $\xi_r$, and $\eta$ were assumed to propagate to the output equation according to the following error propagation equation:

$$K = CA^{-1}Q_r(CA^{-1})^T + (D - CA^{-1}B)Q_u(D - CA^{-1}B)^T + R \quad (38)$$

A likelihood function for the pump system was written by estimating variances $Q_i$ and $Q_x$. The values for the variance of the power, $Q_u$, and back emf, R, were provided as input values, and vectors $\xi_r$, $\xi_u$, and $\eta$ were assumed to be normal with corresponding variances $Q_u$, $Q_r$, and R. The likelihood function appears as $$f(y) = \frac{1}{(2\pi)^{n/2}(\det K)^{1/2}} e^{-\frac{1}{2}(y-\mu)^T K^{-1}(y-\mu)} \quad (39)$$

where the mean value $\mu$ is given by $$\mu = g_{fpm}[x_a, u, \alpha, 0, 0] + g_{nn}[x_a, u, w, 0, 0] \quad (40)$$

On-line monitoring was performed to determine whether degradation of the peristaltic pump tube wall could be detected as an event lying outside the normal operating envelop of the SQNA modeled pump system. The electrical power to the motor was the system input (u), and the back emf, which was learned during the deterministic model adaptation step, was the system output (y). The above developed SQNA model, Eqs. (36) and (37), represented the normal operating condition of the pump system.

Figure 6:
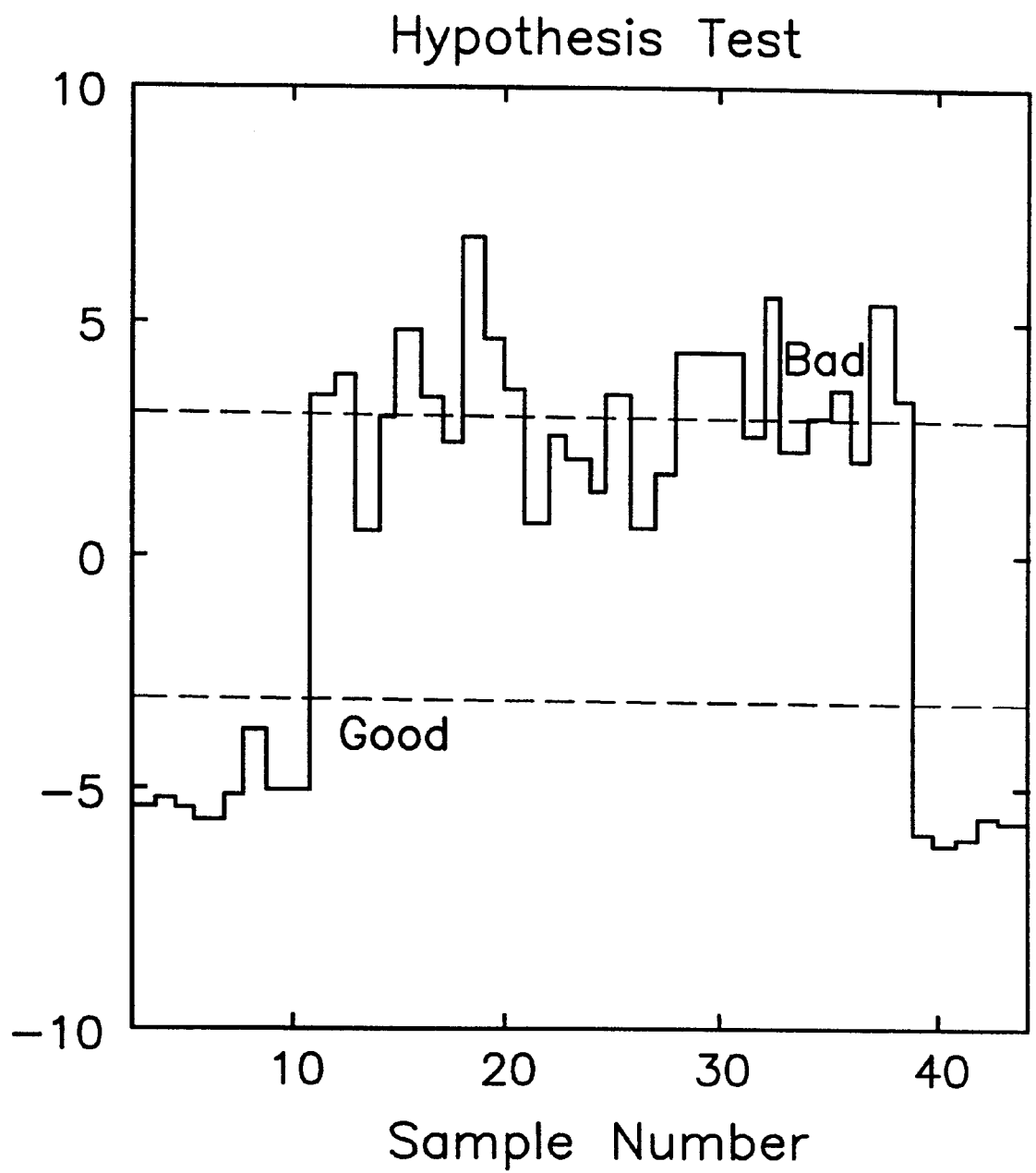
FIG. 6 is a graphical illustration of the SQNA model for monitoring the condition of a peristaltic pump using a hypothesis test, e.g., sequential probability ratio test (SPRT)

Wald's SPRT was applied to the monitoring system to monitor the system for changes. The test statistic $S_m$ was calculated each time a new sample arrived and was compared with two thresholds A and B, where a measured output value ($y_{measi}$) less than B signaled the pump system is operating normally, e.g., consistent with the SQNA model output, and a measured output value ($y_{measi}$) greater than A signaled a disturbance in the pump system, e.g., inconsistent with the SQNA model output. (For value between A and B, the operating condition is indeterminative). The pump was operated for a period of 24 hours, a period of sufficient duration for visible changes to occur in the silicon tube, e.g., fine cracks, change in cross section in relaxed state, however, no leak developed. FIG. 6 graphically illustrates the results of the three separate measurement collection intervals: data corresponding to the first and last intervals was collected for the pump system having a new tube component, while the data for middle interval (samples 12 to 38) was collected after the 24 hr period, wherein the tube component was significantly damaged.

Figure 7:
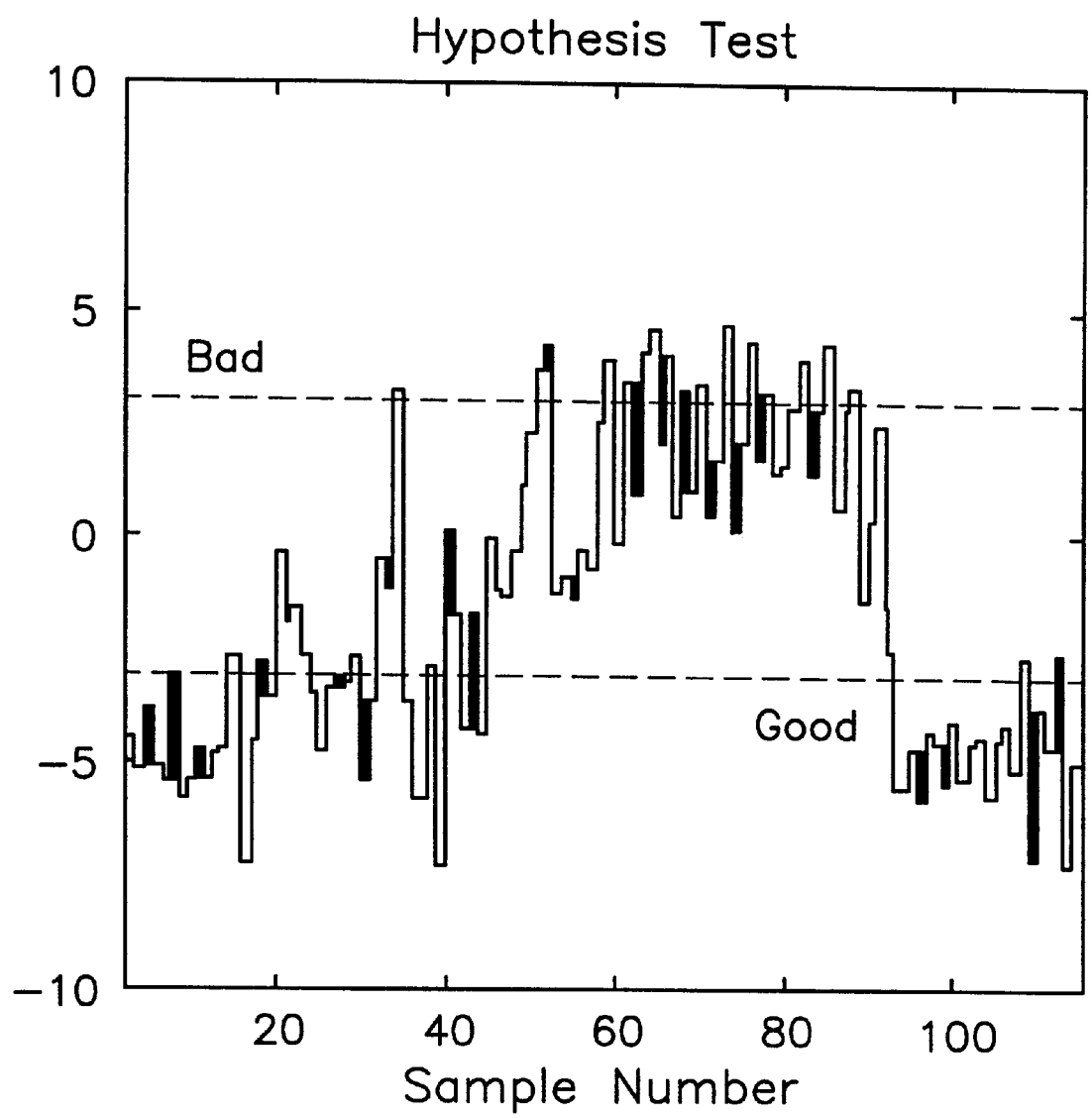
FIG. 7 is a graphical illustration of the SQNA model for monitoring the condition of a peristaltic pump using a hypothesis test, wherein liquid soap has been substituted for water in the hydraulic circuit of the pump.
Figure 8:
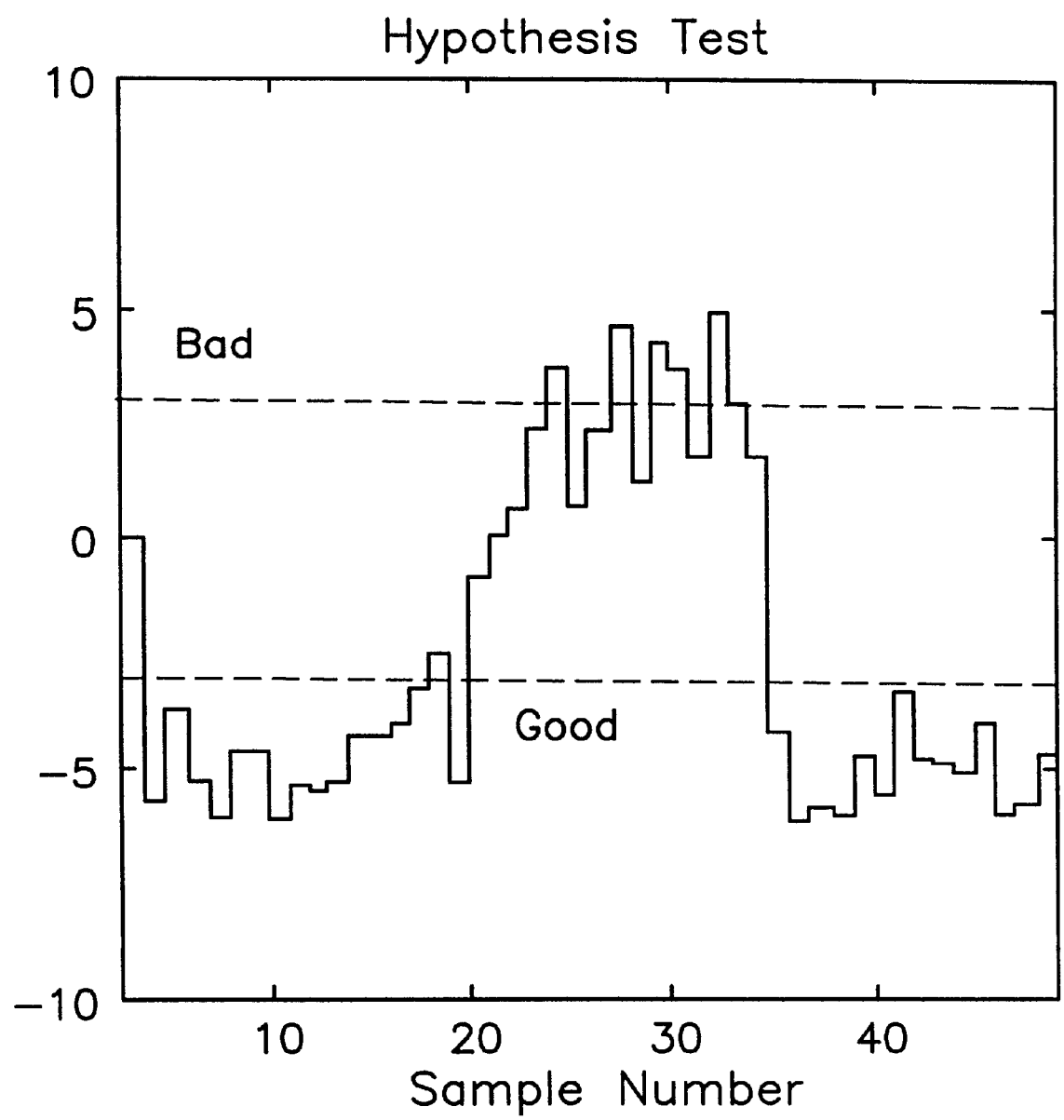
FIG. 8 is a graphical illustration of the SQNA model for monitoring the condition of a peristaltic pump using a hypothesis test, wherein a mechanical drag has been increasingly subjected to the pump shaft to demonstrate the sensitivity of the SQNA model for detecting change in the state of the pump process.

Mechanical changes that upset the balance between power and back emf were deliberately introduced into the pump system, including increasing the drag on the motor shaft to simulate bearing failure, substituting a more viscous fluid into the hydraulic circuit, and operating the pump for a time sufficient to induce fatigue in the tube component. FIG. 7 graphically shows the ability of the SQNA model to detect change in the pump system caused by substituting liquid soap for the water in the hydraulic circuit. FIG. 8 graphically shows the sensitivity of the SQNA model for detecting change in the pump system, as a mechanical drag was increasingly subjected to the pump shaft. A minimal amount of pressure signaled change, indicating that the SQNA model is highly sensitive to any change in load.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention, rather the scope of the invention is to be defined by the claims appended hereto.

The embodiments of the invention in which an exclusive property or privilege is claimed are defined as follows:

1. A method for monitoring operation of an apparatus having known and unknown operating characteristics to detect a change in the operation of the apparatus, comprising the steps of:
   generating an analytic model of the apparatus from the known operating variables of the apparatus;
   collecting input data and output data characteristic of the operation of the apparatus through a neural network;
   augmenting the analytic model with a neural network resulting in a combined neuro-analytic model, whereby the neuro-analytic model is capable of learning relationships between the collected input data and collected output data and representing the unknown operating characteristics of the apparatus in the neuro-analytic model;
   training the neuro-analytic model by minimizing any error between the collected output data and output data generated by the neuro-analytic model for a given set of input data;
   statistically qualifying any remaining error in the neuro-analytic model by writing an error propagation equation to describe any effect of the error on output data generated by the neuro-analytic model, and applying a statistical technique to maximize the likelihood that the output data generated by the error propagation equation is the same as the collected output data; and
   utilizing the statistically qualified neuro-analytic model to monitor the operation of the apparatus by observing output data generated by the statistically qualified neuro-analytic model to detect the change in the operation of the apparatus.

2. The method according to claim 1, further comprising the step of applying a probability test to the statistically qualified neuro-analytic model to validate the model.

3. The method according to claim 2, wherein the probability test is Wald's sequential probability ratio test.

4. A method for monitoring a process having certain and uncertain variables to detect process change, comprising the steps of:
   a) deterministic model adaptation, comprising the steps of:
      developing an analytic model of the process representing certain process variables;
      augmenting the analytic model with a neural network that maps uncertain process variables, whereby a neuro-analytic model results; and
      minimizing any error in the neuro-analytic model; and
   b) stochastic model adaptation, comprising the steps of:
      developing an error propagation equation by incorporating random variables representing unmodeled process uncertainty into the neuro-analytic model;
      linearizing the neuro-analytic model incorporating the random variables, whereby the error propagation equation describes the effect of the random variables on the neural-analytic process output;
      utilizing a likelihood function to maximize the accuracy of the neuro-analytic model by estimating variances for the random variables and applying the likelihood function to determine values for the variances that generate neural-analytic model output that is essentially the same as measured process output; and
   c) process monitoring, whereby the neuro-analytic model is used to detect changes in the process.

5. The method according to claim 4, further comprising the step of utilizing a statistical probability test to validate the statistically qualified neuro-analytic model.

6. The method according to claim 5, wherein the step of utilizing a statistical probability test further comprises utilizing Wald's sequential probability ratio test.

7. The method according to claim 4, wherein the error minimization step comprises the steps of:

measuring maximum values for the known and unknown variables of the neuro-analytic model;

developing an error minimization equation for minimizing any difference between measured process output and output generated by the neuro-analytic model, whereby the error minimization equation incorporates the maximum operating values; and adjusting weights of the neural network to minimize the solution of the error minimization equation.

8. The method according to claim 7, wherein the weights are adjusted until the difference between the neuro-analytic model output and the measured process output is minimized to a value of less than about 1%.

9. The method according to claim 4, wherein the analytic model development step comprises the step of developing an analytic model of the steady state of the process comprised of a state equation and an output equation, the augmentation step comprises the steps of augmenting the state equation with a neural network state vector function including neural network weight parameters and augmenting the output equation with a neural network vector function including neural network weight parameters, and the error minimization step comprises the step of adjusting the neural network weight parameters according to an error minimization equation.

10. The method according to claim 4, wherein the neural network is a multi layer feed-forward neural network.

11. The method according to claim 4, wherein the unknown variables of the process are assumed to be observable in input-output measurements mapped by the neural network.

12. A statistically qualified neuro-analytic (SQNA) monitoring system for detecting change in the steady-state operation of an apparatus, comprising:

a neuro-analytic model of the apparatus comprised of an analytic model representing known operating characteristics of the apparatus and a neural network representing unknown operating characteristics of the apparatus;

means for training said neuro-analytic model, whereby any difference between output generated by said neural-analytic model and output collected from operation of the apparatus is minimized;

means for qualifying the uncertainty of the neuro-analytic model;

means for comparing the qualified trained neuro-analytic model output to output collected from operation of the apparatus; and means for signaling a change in the steady-state operation of the apparatus.

13. The SQNA monitoring system according to claim 12, whereby in the neural network is a multi layer feed-forward neural network.

14. The SQNA monitoring system according to claim 12, whereby said qualification means comprises determining a likelihood function for the trained neuro-analytic model.

* * * * *